United States Patent [19]

Bradshaw

[11] Patent Number: 5,431,763
[45] Date of Patent: Jul. 11, 1995

[54] LINERLESS LABELING SYSTEM

[75] Inventor: Franklin C. Bradshaw, Scottsdale, Ariz.

[73] Assignee: Boss Systems, L.L.C., Scottsdale, Ariz.

[21] Appl. No.: 978,733

[22] Filed: Nov. 19, 1992

[51] Int. Cl.6 .......................................... B32B 31/18
[52] U.S. Cl. ................... 156/256; 156/285; 156/290; 156/357; 156/521; 156/542; 156/261
[58] Field of Search .............. 156/64, 350, 354, 542, 156/521, 261, 285, 290, 357, 256

[56] References Cited

U.S. PATENT DOCUMENTS

| Re. 32,249 | 9/1986 | Esmay | 428/40 |
|---|---|---|---|
| 3,520,751 | 7/1970 | Cranfill | 156/261 X |
| 3,525,657 | 8/1970 | Svec | 156/261 X |
| 3,630,805 | 12/1971 | Fried | 156/354 |
| 3,823,050 | 7/1974 | Mers | 156/521 X |
| 3,880,692 | 4/1975 | Jeffries | 156/261 |
| 4,181,554 | 1/1980 | Rich | 156/261 |
| 4,716,052 | 12/1987 | Waugh et al. | 427/147 |
| 4,784,714 | 11/1988 | Shibata | 156/354 |
| 4,863,551 | 9/1989 | Ogura | 156/261 X |
| 4,895,614 | 1/1990 | Trouteaud et al. | 156/571 X |
| 4,978,415 | 12/1990 | Jones | 156/521 |
| 4,985,096 | 1/1991 | Bekker-Madsen | 156/353 |
| 5,122,108 | 6/1992 | Segalowitz et al. | 156/521 |
| 5,149,392 | 9/1992 | Plaessmann | 156/542 |

Primary Examiner—David A. Simmons
Assistant Examiner—J. Sells
Attorney, Agent, or Firm—Gregory J. Nelson

[57] ABSTRACT

A linerless labeling system which utilizes a transparent or opaque paper or plastic film substrate. The substrate is provided in web roll form and is printed on one side with an image overcoated with an adhesive. The opposite surface has release characteristics. When applied, the web is fed across an anvil plate. A die engages the anvil plate, cuts the label from the web which label is then transferred to the surface of an item such as a plastic container.

11 Claims, 2 Drawing Sheets

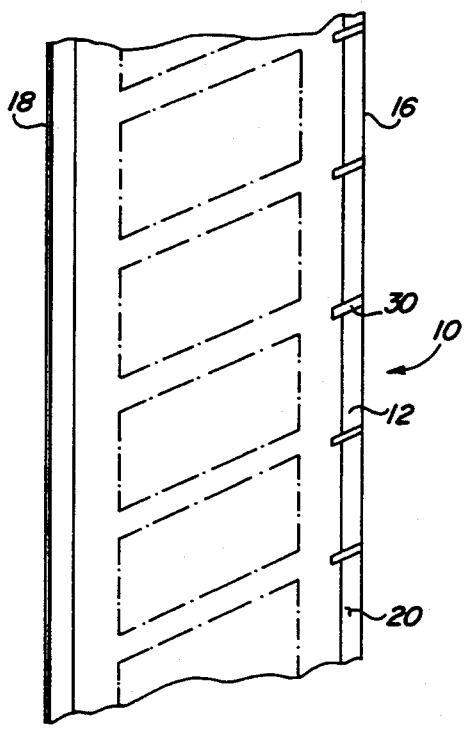
FIG. 1
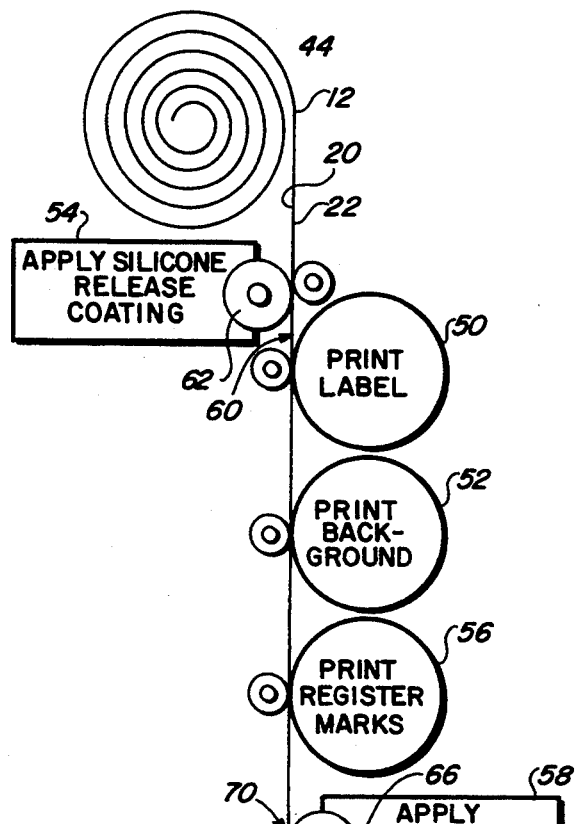
FIG. 3
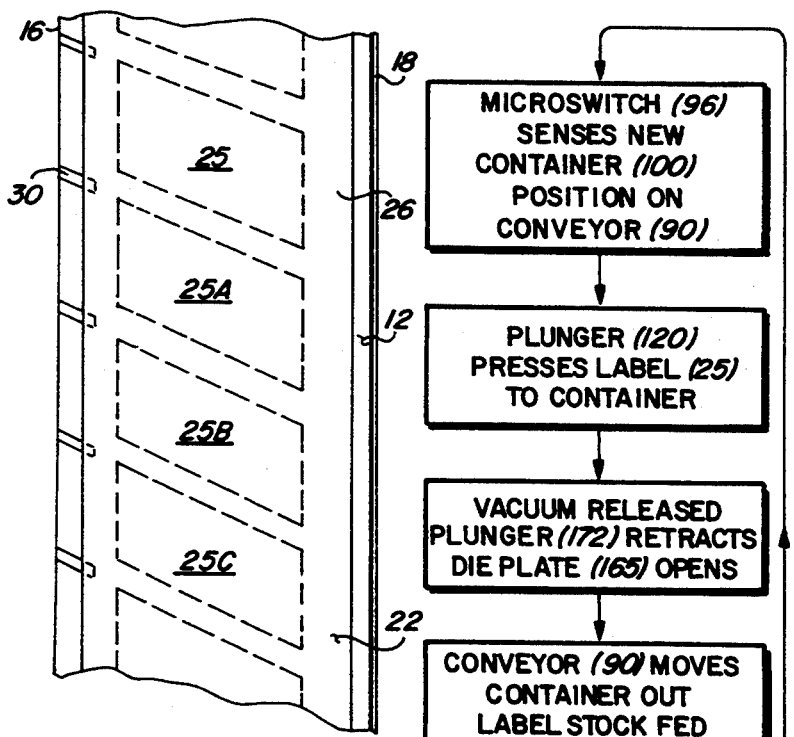
FIG. 2
FIG. 5
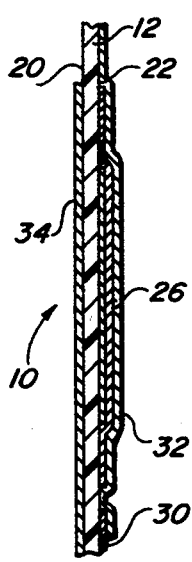
FIG. 4

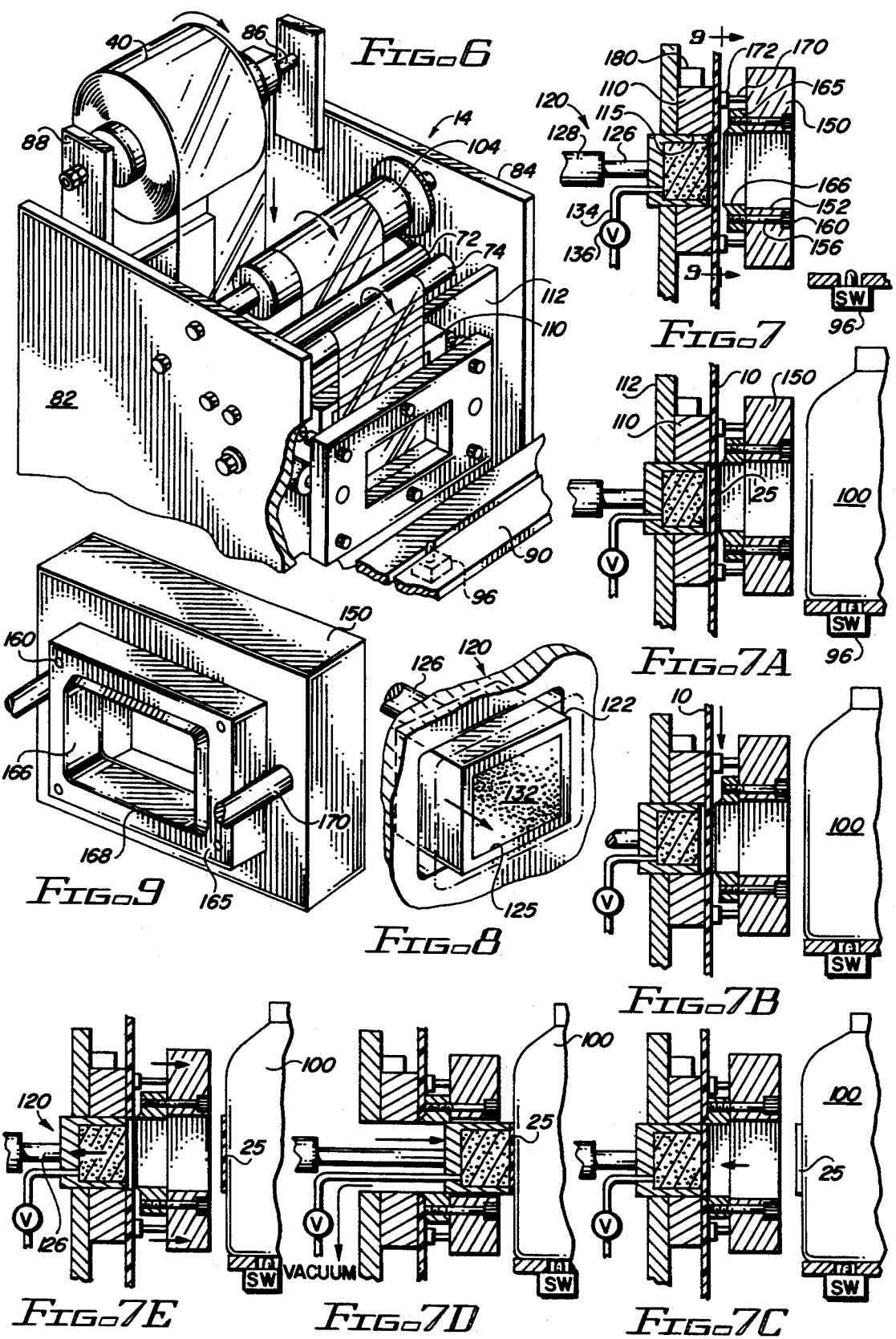

LINERLESS LABELING SYSTEM

The present invention relates to a linerless labeling system and more particularly relates to a system for which a substrate such as paper, polyester film or polypropylene film is printed with an image forming a printed web and the web is then transferred to an applicator. At the applicator the pre-printed web is fed through a die which severs a portion of the web defining the label area and then transfers the label directly to the article. A typical article is a packaging container which may be plastic or other materials.

The general field of labeling in which a label is provided without a backing material is generally termed the field of linerless labels. In a linerless label system, a substrate such as plastic film is repeatedly printed with the label images on one side and coated with an adhesive on the other side. The material is rolled and the labels are severed and applied directly to a surface of a container such as a milk container, oil container or the like. Various systems can be found in the prior art in which the printed substrate is coated with adhesive on one side and is provided in roll form eliminating the need for a backing. Reference is made to the article on linerless labels appearing in the August, 1990 *Packaging Digest*. While various systems for applying such labels can be found, generally no satisfactory system has been provided for the production of a web material having a pressure-sensitive adhesive on the web and which system accurately applies the labels to a container in a manner which is efficient and inexpensive.

U.S. Pat. No. 4,978,415 discloses an apparatus for applying labels to articles. The labels are cut from a web which has an adhesive applied to one side. The machine includes cutting rollers which cut through the adhesive side of the web in order to sever the labels. The cutting edges of the rollers are kept clean by application of a liquid silicon or similar release composition.

U.S. Pat. No. 4,522,870 (reissued as RE 32,249) discloses a linerless, double-coated pressure adhesive tape which is mounted directly upon itself in a roll so that it can be later unwound. The patent is directed to a composition of the pressure-sensitive adhesive which is a cross-link alkyl acrylate polymer.

U.S. Pat. No. 4,842,902 discloses a method for preparing an improved, peelable protective backing for pressure sensitive adhesives (PSA), particularly those which are described in the patent as solvent cast silicon curable pressure-sensitive adhesives. The invention involves applying certain curable fluorosilicon compositions to a substrate and curing the applied composition before it is brought into contact with the PSA.

U.S. Pat. No. 4,716,052 relates to a method of making a pressure-sensitive adhesive stock material which eliminates the need for self-supporting paper, cardboard or plastic substrate. A layer of pressure-sensitive adhesive is provided on a release liner.

U.S. Pat. No. 4,784,714 discloses a linerless thermal label printer and applicator. The cutter is provided to separate the linerless thermal sensitive paper into individual labels. A vacuum system transports the separated labels from a cutting station to an adhesive station and thereafter to a label ejection station. At the adhesive station, adhesive is activated and a vacuum blower system at the label ejection station causes the separated label to be transferred to the item.

In accordance with the present invention, a linerless labeling system is provided which utilizes a suitable substrate which may be paper or a synthetic film such as polyester, polypropylene or a similar printable flexible material. The substrate is provided in strip form and is printed on one side with a suitable image in any desired shape and colors. Preferably the substrate is transparent and the printed label image is applied to the surface of the label which will subsequently be applied or placed in contact with the article. Registration marks, which may be printed indicia, notches or holes, are applied at predetermined locations along the substrate to facilitate automatic registration during application. An adhesive is applied over the printed image by spraying, by rolling or by other conventional techniques and may be heat or water activated. The opposite side has release properties or is coated with a release agent. The completed web is wound into a roll and provided to the user in roll form.

If the substrate is opaque, as in the case of paper, the release coating is applied over the printed image and the adhesive is applied to the opposite surface. Registration indicia are provided at regular intervals.

The applicator equipment for applying the labels includes a unwind shaft on which the roll is mounted. The web is fed across an anvil plate which defines an aperture which receives a reciprocable transfer member. The transfer member has a recess which contains a soft, porous material such as a sponge. The transfer member is operatively connected to a plunger or actuator and the interior of the member communicates to a low vacuum source. An oppositely disposed cooperating clamp plate receives an interchangeable steel rule die which cooperates with the anvil plate to sever the label when the two are brought into engagement.

The web is pre-marked with locator or registration marks which are sensed as by an optical reader or other sensor. The applicator unit is positioned adjacent a conveyor line along which the articles to be labeled move. A typical application would be the labeling of plastic milk bottles. A microswitch or other sensor senses the presence of an article aligned with the applicator unit. The optical reader or other sensor senses the registration markings and causes the clamping plate and to retract bringing the die against the substrate and anvil plate at the proper location. The die cuts the label from the web and the transfer member extends to transport the removed label, which is held in place by the vacuum, to the appropriate surface location on the packaging or container. The adhesive on the label surface adjacent the article secures the label to the article and the vacuum is released allowing the transfer to return to a retracted position so the next printed label on the web may be advanced. Since the printed image is on the surface of the web adjacent the container, it is protected from moisture or chemicals or other damaging environmental elements which may be present. The die being a steel rule die is of simple construction and may be easily changed in accordance with the label configuration.

In accordance with the foregoing, a principal object of the present invention is to provide a linerless label system which eliminates the requirement for expensive paper release liners such as those coated with silicone.

Another object is to provide labels pre-printed web roll form which labels are adhesively coated, printed and provided with a release coating to facilitate easy unwind, removal and application.

Another object of the present invention is to provide a roll of linerless labels which eliminates the need for a backing thereby substantially increasing the number of labels available on a single roll of labels.

Another object of the present invention is to provide a linerless label which is fabricated from a substrate of paper or a thin plastic such as polyester, polypropylene or polyethylene film forming a label which is environmentally stable and resistant to water, humidity and many chemicals.

Another object of the present invention is to provide an applicator including a die which cuts and removes the labels from an adhesive coated web and which has means for transferring the severed labels directly to the article to be labeled.

The above objects and advantages along with a more complete understanding of the present invention will be had from the following description and claims, taken in conjunction with the accompanying drawings in which:

FIG. 1 is a top side view of a portion of a web of printed linerless labels in accordance with the present invention;

FIG. 2 is a back side view of a portion of a web provided with printed labels in accordance with the present invention;

FIG. 3 is a schematic representative showing the preparation of the web and roll of linerless labels;

FIG. 4 is an enlarged cross-sectional view of a portion of the web;

FIG. 5 is a block diagrammatic representation of the steps in applying a linerless label to an article;

FIG. 6 is a perspective view of the applicator machine;

FIGS. 7 to 7E illustrate the sequence of operations carried out by the applicator in severing and applying a label to an article;

FIG. 8 is a detail view of the label transfer member; and

FIG. 9 is a view taken along line 9—9 of FIG. 7.

For purposes of consistency throughout this specification, the term "substrate" is used herein to describe the paper or plastic base material to which the printing and adhesives and coatings are applied. The term "web material" or "web" will be used to describe the substrate material which has been printed, coated with an adhesive, and a release agent. The web material is provided in roll form for application. The invention described herein is applicable to the labeling of articles including packaging containers such as cans, bottles and boxes which may be paper, metal or plastic. It will be appreciated that the invention also has application to a wide variety of packaging containers but for purposes of description, reference will be made to labeling containers such as plastic milk bottles and similar liquid containers which are intended to be exemplary of use of the system.

The first principal component of the system is the rolled web containing a plurality of pre-printed linerless labels and the second aspect of the invention is the application of these labels to an article.

Turning first to the preparation of labels in rolled web form, FIGS. 1, 2 and 4 show a section of the web 10 which is provided to the label applicator in roll form as will be explained in detail hereafter. The web 10 is used in an applicator unit 14 in pre-printed roll form and has a suitable substrate 12 which may be paper or plastic film. Although paper may be used, preferably the substrate 12 is a thin plastic film, such as 1 mil polyester, polypropylene or polyethylene and is transparent or translucent. The substrate 12 is shown as being a strip having opposite longitudinal edges 16 and 18, top and back surfaces 20 and 22, respectively. The term "back" surface is used with reference to the surface of the substrate that it will be applied to the packaging article and the term "top" refers to the outer surface which is exposed when the label is in place. The back surface 22 of the substrate is printed with a repetitive image defining the label pattern 25, 25A, 25B, etc. The label sets forth the pertinent information and may be arranged in any convenient shape, rectangular being shown. As indicated, the label information is printed on the back surface 22 of the substrate and may be overprinted with opaque coating 26 in the event the item to which the label is to be applied is transparent. Since the label 25 appears on the back surface of the substrate, the printing is protected from exposure to the environment, moisture and wear and tear by the substrate itself once applied to an article.

Registration indicia 30 are provided at spaced-apart locations along the substrate preferably at an edge. The registration indicia 30 may be imprinted so they may be optically read so as to properly register the label in the applicator unit 14. The registration indicia may also be in the form of notches or cut-outs at spaced-apart locations in the substrate which may be optically or mechanically sensed to properly index and register the completed web in the applicator 14.

Once the substrate is printed and provided with the registration indicia 30, an adhesive coating 32 is applied to the back surface over the label pattern and, if needed, suitable release coating 34 is applied on the top side. The printed, adhesive and release coated substrate is then wound into a web roll 40 ready to be provided to the user.

If the substrate is opaque, as in the case of paper, the printed label image 25 is applied to the top, rather than the back surface 22 so as to be readable when applied.

FIG. 3 schematically depicts the preparation of the web roll 40. The substrate 12 which is preferably a thin, elongate strip of material as described and is provided as roll stock 44. The desired repetitive images 25 are applied to surface 22 at printing station 50. The printing can be accomplished by any convenient printing technique such as conventional flexographic techniques. The printing may be multi-color and an opaque overcoating 26 may be applied at station 52, if desired. The top surface 20 of the substrate is coated with a release coating at station 54. The composition of the release coating used may vary with the composition of the substrate but typically the release coating will be a silicon which may be applied by a spray applicator. Some materials such as polypropylene exhibit inherent release characteristics and additional application of a release coating may not be necessary.

Other methods of applying a release coating may also be used which generally involve passing the substrate over a roller 62 to which is applied the silicon. The silicon is transferred to the substrate and appropriate wiping blade 60 cooperates with the roller to control the amount of release agent applied to the substrate. In some cases, the substrate may be dried by fans, heat or application of radiant energy such as UV.

The back surface 22 of the substrate is provided with index or registration marks 30 at station 56 which are applied at an edge and outside the label image area. The substrate is coated with a suitable adhesive at station 58.

The type of adhesive will vary with the characteristics of the substrate. For example with a polyester substrate, adhesives such as rubber based acrylics have been found to be suitable. The adhesive can be applied by spraying or may be applied by an application roller 66 which rotates through a bath of adhesive and thereafter contacts the surface of the substrate. Other adhesives may be used and are well known to those skilled in the art. Adhesives which are water or heat activated may be used and activated at the time of application.

Suitable doctor or wiping blades 70 may be provided for removing excess adhesive from the substrate. Thereafter, the adhesive may be suitably dried by application of heat or other forms of energy such as RF energy at station 72.

The registration or indexing indicia 30 are applied at predetermined spaced-apart intervals located to register the labels with the applicator machine 14 during the application process. The registration marks may be printed on the substrate or may be in the form of apertures or notches provided along an edge of the substrate. The substrate is then wound into a roll web 40 ready for the applicator 14 and is provided to the labeler in this form.

The applicator unit 14 is best shown in FIGS. 6, 7, 8 and 9. The sequence of labeling operations is shown in FIGS. 5 and 7A to 7E. The applicator unit 14 includes a frame which has opposite side walls 82 and 84. Unwind shaft 86 extends transversely between the side walls and is supported at opposite ends at bearing plates 88. The roll web 40 of label stock is mounted on shaft 86. The individual labels 25, 25A, 25B, etc. are die cut from the web as it is fed from the roll and applied to the containers. The containers to which labels will be applied are indicated by the numeral 100 and are shown as polyethylene milk containers as for example the type normally containing one-half gallon of milk. The containers are advanced to the application station adjacent the applicator machine 14 by a conveyor 90 on which is located a sensor 96 shown as a microswitch. Sensor 96 identifies the presence of a container and actuates the applicator when the container 100 is properly located on the conveyor with respect to the applicator unit 14. After labeling, labeled containers are advanced and a new container to be labeled is moved into position adjacent the applicator.

The web 10 extends over a feed roller 104 and between first and second pairs of guide rollers 72 and 74 extending transversely between the side walls of the applicator and aligned with the anvil plate 110. A conventional unwind unit, not shown, serves to draw the web 10 from the roll 40 in the path described above. Suitable tensioning devices to maintain proper tension on the feed stock may be incorporated and description is not necessary to an understanding of the invention as these devices are well known in the art.

Anvil plate 110 is mounted on a support plate 112 which support plate extends vertically transversely between the side walls of the unit. Anvil plate 110 defines an opening 115 which receives the transfer member 120. Preferably the lateral dimension of the opening 115 in the anvil plate is less than the size of the label so that the severed label may be supported on the transfer member during the application operation.

The cutting of the label is accomplished by a die 165. Die 165 is shown as a steel rule die which has an exterior cutting edge 168 which is configured in the desired shape of the label to be applied to the container. The die may be any suitable material such as tool grade steel and is detachably secured by screws 160 at the inner side of clamping plate 150. The die defines a cavity 166 extending rearwardly from the cutting edge 122.

Clamping plate 150 is vertically disposed at a location spaced apart from anvil plate 110. The clamping plate is shown as a rectangular steel block having a central opening or aperture 152 which is larger than the opening in the die. Threaded bores 156 extend through the plate adjacent the aperture and receive machine screws 160. The die 165 is detachably securable at the inner side of the clamping plate by threaded bores which receive the ends of screw 160. The opening in the die is aligned with the opening 115 in the plate. It will be apparent that the die 165 may be changed by simply removing the machine screws 160 and replacing the die 165 with another die having the desired cutting shape.

The clamping plate is supported on a pair of cylinder rods 170, each operably connected to a pneumatic or hydraulic cylinder 172 which by means of rods 170 move the clamping plate toward and away from the anvil plate 110. An optical sensor 180 is located above the plate and initiates the application sequence once the microswitch 96 has energized the application machine.

The transfer member 120 is extendible from the anvil plate and has a housing 122 defining an outwardly opening cavity 125. The housing 122 is selectively extendible and retractable by means of rod 126 of actuator 128. The cavity 125 is dimensioned so as to be smaller than the label to be applied. The cavity contains a sponge or other porous material 132 and is connectable to a low vacuum source via conduit 134 across valve 136 so that a low vacuum may be applied to the cavity and released as required to transport and deposit the severed label.

The electrical controls and the pneumatic or hydraulic systems are well known in this particular art and detailed description of these is not deemed necessary. Similarly, the control system may also include devices to regulate the tension of the web as it is unwound and such tensioning devices generally pneumatic in nature are also well known.

The invention will be better understood from the following description of operation.

Once the applicator unit 14 is properly positioned adjacent the conveyor 90 on which articles to be labeled are placed, the unit operates as follows. The presence of an article 100 to be labeled is sensed by microswitch 96 which switch will serve to actuate the applicator machine. The position of an article ready to receive a label is as shown in FIG. 7A as the article is aligned with the male and female dies. The applicator has been suitably loaded with a web roll 40 pre-printed and coated with a release and adhesive as has been described which will be unrolled to dispense a continuous web 10. When the applicator 14 is actuated, the optical sensor 180 will properly advance the web 10 so that a selected label 25 is properly positioned with respect to the anvil plate and die as seen in FIG. 7A. Once registration is proper, actuators 170 will cause the clamping plate 150 to retract, bringing the die 165 into engagement with the web. In this position, the web stock is interposed between the die 165 and the anvil plate 110 as seen in FIG. 7B, severing the label in the shape determined by edge 168. The transport member 120 is actuated in the sequence and moves forward under the influence of the cylinder 128 and simultaneously a low vacuum is applied via conduit 134 to cavity 130 in the die as seen in FIG. 7C. The transport member removes the severed label from the web and continues to move outwardly as seen in FIG. 7D. The member 120 continues to move until the transported label contacts a surface of the container. At this point, the adhesive coating on the back surface of the removed label 25 will adhere to the surface of the container. The vacuum in cavity 130 is released and the member 120 retracts and the clamping plate and die move outwardly away from the anvil plate to permit the web to advance a predetermined distance as established by the registration indicia as illustrated in FIG. 7E. The container 100 with the applied label is advanced on the conveyor and a new container is moved into position actuating switch 96 to initiate repetition of the operation.

Thus, it will be seen from the foregoing that the present invention provides a substantial number of advantages. The linerless label eliminates the need for expensive silicon coated paper release liners, printed paper stocks and plastic film laminates which are conventionally required to make durable labels. With the present invention, a single web is provided which is adhesive coated, pre-printed and provided with release lining so that it will be supplied to the user in roll form for easy unwinding.

The applicator of the present invention allows the use of thinner labels which makes recycling of the containers to which the labels are supplied more feasible.

The linerless labels of the present invention also permit the number of labels per roll to be increased, for example five to six times, requiring less storage space and providing a more efficient operation as the re-loading time on the applicator is reduced.

The linerless labels as indicated can be made from various materials, preferably plastic films, including the newer plastic films which may be more environmentally safe and biodegradable. Also, the printing of the linerless labels on the back of the label protects the labels from exposure to water, humidity and other chemicals.

Waste disposal is reduced, both at the manufacturing level and during application resulting from the fact that much less bulk is used.

The steel rule dies are easily interchangeable and may be used to cut labels of almost any shape from the adhesive coated web.

The simple label feed dispenser for the single film labels is efficient, effective and simple.

It will be obvious to those skilled in the art to make various changes, alterations and modifications to the system described herein. To the extent those various alterations, modifications and changes do not depart from the spirit and scope of the appended claims, they are intended to be encompassed therein.

I claim:

1. The method of labeling an article comprising:
   (a) providing a roll of a flexible substrate having opposite surfaces and having pre-printed images at predetermined intervals along the substrate, said substrate being at least partially coated on one surface with an adhesive;
   (b) feeding the substrate from the roll to an application station at a predetermined feed rate;
   (c) positioning the article to be labeled adjacent the application station;
   (d) providing an interchangeable die at the application station having a predetermined shape in the desired shape of the label to be applied to the article and which has an opening extending through the die;
   (e) bringing the die into contact with the substrate generally normal to the substrate against an oppositely positioned generally planar anvil plate by moving said die toward said anvil plate to sever a label of predetermined shape from said substrate;
   (f) bringing a transfer member into contact with the severed label and applying and maintaining a predetermined vacuum on the transfer member to retain the severed label thereon;
   (g) extending the transfer member through openings in the die and anvil to bring the severed label into contact with the article with the adhesive surface of the label against the article; and
   (h) thereafter releasing the vacuum and withdrawing the transfer member leaving the label affixed to the article.

2. The method of claim 1 wherein said substrate has printing applied to one surface and adhesive applied over the said printing and a release agent applied to the opposite surface of the substrate.

3. The method of claim 1 wherein said substrate is provided with spaced-apart registration marks and further including the step of sensing the registration marks to advance and position said substrate with respect to said die cutter at a predetermined rate.

4. The method of claim 1 wherein said substrate comprises a thin, flexible plastic film.

5. The method of claim 1 wherein said substrate is paper which has printing and a release coating on one surface and an adhesive on the opposite surface.

6. The method of claim 1 wherein said adhesive is heat activated at the time of application.

7. The method of claim 1 wherein said adhesive is water activated at the time of application.

8. An applicator apparatus for applying labels to articles which labels are provided on a web which is moved sequentially past an application station comprising:
   (a) feeding means for feeding a web having opposite surfaces and having labels repetitively printed on a surface thereof and having an adhesive on the other surface thereof, said web being provided with registration indicia;
   (b) a die having a cutting edge of a predetermined shape and defining an opening therethrough, said die being interchangeably mounted on a clamping plate;
   (c) an anvil plate having a generally planar surface positioned adjacent said die and defining an opening receiving a retractable and an extendable transfer member aligned with said opening;
   (d) means for selectively moving said die toward said anvil plate into contact generally normal to the web to sever a selected label from said web;
   (e) means for selectively applying a vacuum to said transfer member;
   (f) sensing means for advancing said web at an intermittent predetermined rate whereby a label is severed by said die and the label transferred to the surface of an article by extending said transfer member through said die and said opening in said anvil; and
   (g) means for releasing said vacuum when said label is applied to the article.

9. The apparatus of claim 8 wherein said transfer member defines a vacuum cavity including a porous material therein.

10. The apparatus of claim 8 wherein said articles are delivered to the application apparatus by a conveyor and further including means for sensing the presence of an article at said application apparatus and means responsive to said sensor to activate said application apparatus.

11. The apparatus of claim 8 wherein said control means comprises an optical sensor positioned to read said registration indicia.

* * * * *